(12) United States Patent
Dominici et al.

(10) Patent No.: US 8,441,734 B2
(45) Date of Patent: May 14, 2013

(54) HEAD-UP DISPLAY WITH OPTICAL COMBINATION PROVIDING PROTECTION AGAINST SOLAR ILLUMINATION

(75) Inventors: Johanna Dominici, Eysines (FR); Jean-Claude Ebert, St Medard en Jalles (FR); Jean-Noël Perbet, Eysines (FR)

(73) Assignee: Thales, Neuilly-sur-Seine (FR)

( * ) Notice: Subject to any disclaimer, the term of this patent is extended or adjusted under 35 U.S.C. 154(b) by 303 days.

(21) Appl. No.: 12/833,374

(22) Filed: Jul. 9, 2010

(65) Prior Publication Data

US 2011/0007399 A1     Jan. 13, 2011

(30) Foreign Application Priority Data

Jul. 10, 2009  (FR) ...................................... 09 03424

(51) Int. Cl.
*G02B 27/14*   (2006.01)
*G09G 5/00*    (2006.01)

(52) U.S. Cl.
USPC ............................................ 359/630; 345/7

(58) Field of Classification Search .......... 359/629–632, 359/637; 345/7–9
See application file for complete search history.

(56) References Cited

U.S. PATENT DOCUMENTS

| 6,359,737 | B1* | 3/2002 | Stringfellow ................. 359/631 |
| 6,574,048 | B2 | 6/2003 | Nill |
| 2003/0011536 | A1* | 1/2003 | Chevreau et al. ................. 345/7 |
| 2004/0017282 | A1 | 1/2004 | Eguchi et al. |

FOREIGN PATENT DOCUMENTS

| EP | 0 467 328 A2 | 1/1992 |
| EP | 1 619 533 A1 | 1/2006 |
| JP | 7-17164 B2 | 3/1995 |
| JP | 11-91402 A | 4/1999 |
| WO | 84/02197 A1 | 6/1984 |
| WO | 2008/109231 A2 | 9/2008 |

* cited by examiner

*Primary Examiner* — Alicia M Harrington
(74) *Attorney, Agent, or Firm* — Baker & Hostetler, LLP

(57) ABSTRACT

The general field of the invention is that of head-up display systems HUD, protected from solar illumination. An HUD includes at least one display, an optical system and at least one semi-reflecting plate called a combiner, said optical system and said combiner being arranged so that the image on the display is collimated, the display emitting in at least one first optical spectrum of first spectral width, the display being arranged so as to withstand illumination of a predetermined level. In the display according to the invention, the lateral chromatism of the optical system is sufficiently strong for the level of solar illumination received by the display to be always less than said predetermined level and said lateral chromatism is sufficiently weak for the dispersion of the first spectrum emitted by the display and seen by a user to be less than or equal to the resolution limit of the human eye.

11 Claims, 5 Drawing Sheets

HEAD-UP DISPLAY WITH OPTICAL COMBINATION PROVIDING PROTECTION AGAINST SOLAR ILLUMINATION

CROSS-REFERENCE TO RELATED APPLICATIONS

This application claims priority to foreign France patent application No. 0903424, filed on Jul. 10, 2009, the disclosure of which is hereby incorporated by reference in its entirety.

FIELD OF THE INVENTION

The field of the invention lies in the field of head-up displays, HUDs. These appliances are primarily used in the motor vehicle and aeronautical sectors.

BACKGROUND

The function of an HUD is to enable the driver or pilot to see important information without losing sight of the outside environment. To provide this function, the information obtained from an imager is projected onto a semi-transparent optical element, also called a combiner, using an optical system or relay optic. In daytime use, such information is essentially symbology. After reflection on the combiner, the optical beams are collimated, that is to say projected to infinity so that the pilot can view the symbology and the landscape at the same time without having to adjust visually.

There are two types of combiners. The combiners of the first type are flat plates with no optical power. The combiners of the second type are curved plates that have a certain optical power. Hereinafter in the description, the term "eye box" will be used to designate the region in which the collimated image that is to be seen by the pilot is formed.

The configuration of certain aeroplane cockpits equipped with an HUD is such that, in certain conditions, a portion of the solar radiation may be focused on the surface of the imager, inside the very HUD. This occurs when the solar rays follow the reverse path of the light obtained from the display, either by passing through the combiner or by being reflected thereon. The first transmission case is a problem only if the combiner is a flat plate. The second reflection case is illustrated in FIG. 1. The display or HUD of FIG. 1 comprises an imager 1, a relay optic 2 comprising a dioptric assembly 21 and a return mirror 22 and a curved combiner 3. When the imager is passive, as is the case with liquid crystal screens, it may include a light box 5 which provides the illumination for the imager. As can be seen in this FIG. 1, if the solar rays 11 penetrate the eye box and are then reflected on the combiner 3, they are focused on the imager 1. They can penetrate the eye box only when the pilot is not there, that is to say, for example, in flight when he moves his head or even on the ground when there is no pilot in the cockpit. In both cases, the solar rays then follow the reverse path of that of the information projected on the combiner, which means that they pass through the optical system and are then focused on the information display surface. This display surface can be of different types, more or less resistant to solar illumination. They can then be damaged, reversibly or not, by the solar radiation entering the HUD. It is therefore essential to provide protection for the HUD against solar illumination.

To avoid this problem, the existing solutions consist in reducing the transmission and/or reflection coefficients of the optical system, permanently or as a function of the received solar illumination.

The first solution described in the patent "Method and apparatus for attenuating solar flux in a Head-Up Display" (U.S. Pat. No. 6,574,048 B2) is based on reducing the reflection coefficient of a mirror forming the optical system of an HUD. The induced loss of brightness is offset by an increase in the luminance of the light source, which has the drawback of increasing electrical consumption.

In a second solution described in the patent "Electrically dimmable combiner optics for head-up display" (WO/2008/109231 A2), the transmission from the combiner is controlled electrically. This method is used initially to increase the contrast of the HUD in the presence of a strongly lit landscape by reducing the brightness of the outside landscape without reducing the brightness of the symbology, since the reflection coefficient of the combiner is unaffected by the variation of the transmission coefficient. This technique is therefore applicable in the case of solar rays passing through a flat combiner, but is not applicable in the case of reflection on the combiner.

A third solution described in the patent "Diffraction Head-Up Display solar radiation filter" (WO/1984/002197) consists in introducing, into or very close to the object focal plane, between the information display surface and the optical system, a transmissive array of liquid crystal photodetectors or of a photochromic material, that is to say which darkens or lightens according to the illumination received. The major drawback with this method is the time taken by the photochromic material to become transparent again when it is no longer receiving solar illumination. The result of this is a region in which the information is no longer displayed for a certain time, and this can be a considerable nuisance for the pilot.

SUMMARY OF THE INVENTION

The device according to the invention does not have the drawbacks of the preceding devices. The device according to the invention relies on the one hand on the use of a monochromatic display and on the other hand on the introduction and the use of the chromatism of the optical system to enlarge the image spot of the sun on the imager. The value of the solar illumination is thus reduced on the information display surface, while not impairing the information to be displayed.

More specifically, the subject of the invention is a head-up type display system comprising at least one display, an optical system and at least one semi-reflecting plate called a combiner, said optical system and said combiner being arranged so that the image on the display is collimated, the display emitting in at least one first optical spectrum of first spectral width, the display being arranged so as to withstand illumination of a predetermined level, characterized in that, on the one hand, the lateral chromatism of the optical system is sufficiently strong for the level of solar illumination received by the display to be always less than said predetermined level, and in that, on the other hand, said lateral chromatism is sufficiently weak for the dispersion of the first spectrum emitted by the display and seen by a user to be less than or equal to the resolution limit of the human eye.

Advantageously, the display emits in at least one second optical spectrum of second spectral width, the lateral chromatism of the optical system being sufficiently weak for the dispersion of the second spectrum emitted by the display and seen by a user to be less than or equal to the resolution limit of the human eye.

Advantageously, the combiner comprises at least one flat semi-reflecting plate or at least one curved semi-reflecting plate.

Advantageously, the optical system comprises at least one prismatic optical element.

Advantageously, the display comprises a flat matrix screen lit by one or more narrow-band monochromatic sources, for example lasers or laser diodes of a first type, emitting at a first wavelength. The flat matrix screen can also be lit by one or more monochromatic sources such as lasers or laser diodes of a second type, emitting at a second wavelength that is different from the first wavelength.

Finally, the system comprises means of generating a digital image on said display, said means comprising means of applying a distortion correction to the image, said correction being a function of the geometrical distortion and of the lateral chromatism of the optical assembly comprising the optical system and the combiner.

BRIEF DESCRIPTION OF THE DRAWINGS

The invention will be better understood and other advantages will become apparent from reading the following description given as a non-limiting example, and by virtue of the appended figures in which.

Figure 6:
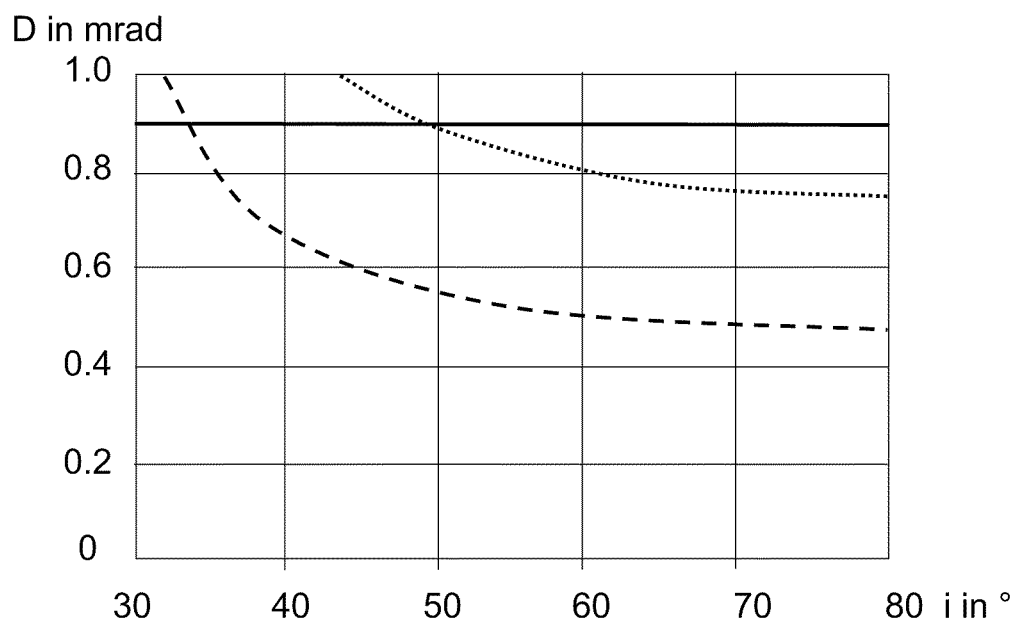

The graph in FIG. 6 shows the deviations induced by the chromatism on the information to be displayed versus the resolution limit of the human eye, as a function of the angle of incidence of the beam on the preceding prism.

DETAILED DESCRIPTION

The device according to the invention comprises an optical system that has a strong lateral chromatism. The dispersion of the solar radiation by the optical system has the effect of enlarging or spreading the image of the sun formed in the focal plane of the optical system, that is to say on the display surface of the imager. The solar flux received remains unchanged but the illuminated surface is increased, hence there is a reduction in the solar illumination. However, in order for the chromatism of the optical system not to degrade the image obtained from the imager, said imager emits in a first optical spectrum of very narrow spectral width. A monochromatic laser source can, for example, be used.

The lateral chromatism of the optical system can be obtained naturally. In practice, when the combiner is a curved semi-reflecting plate that has a significant off-axis value, in order to offset the geometrical aberrations of this plate, the optical system can include highly eccentric or asymmetrical lenses. Given their shape, these elements naturally have a high lateral chromatism that only has to be optimized by the choice of the materials, of the inclinations and of the radii of curvature of the refractive interfaces.

Figure 1:
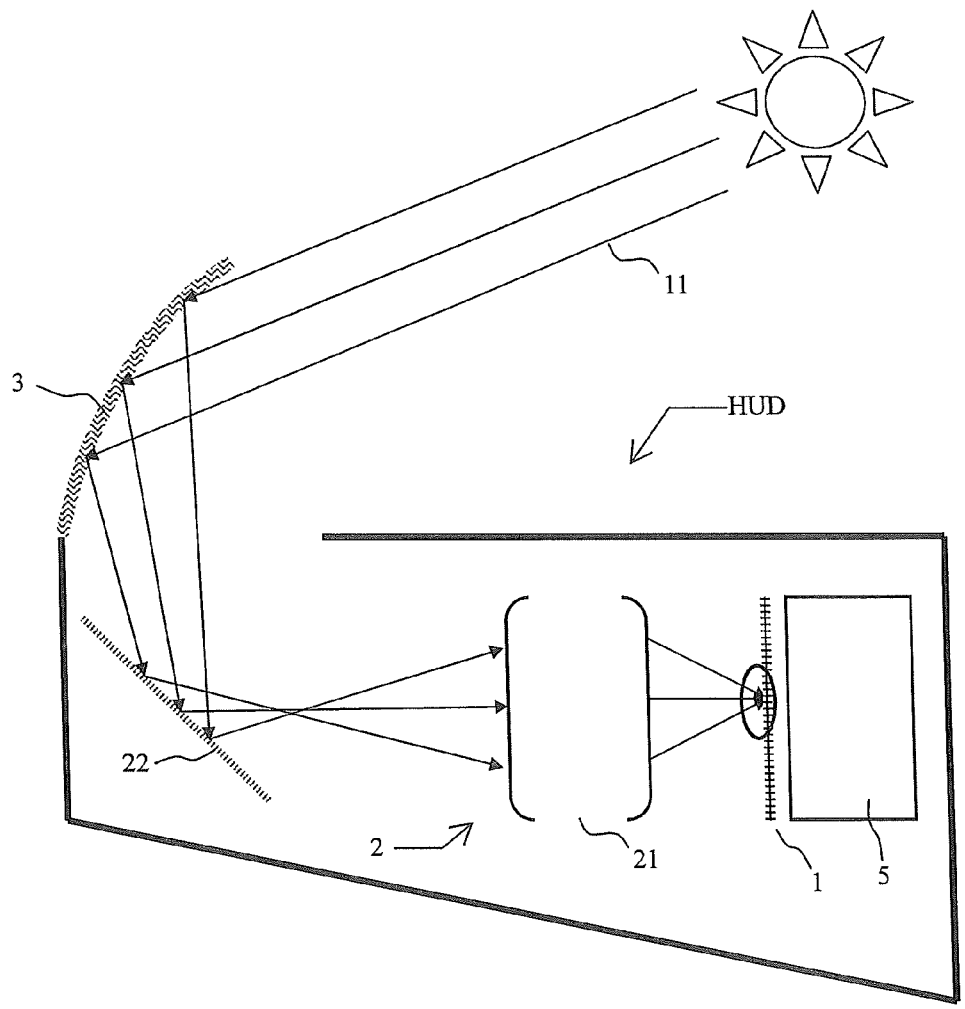
FIG. 1 represents a head-up display according to the prior art subjected to solar illumination.
Figure 2:
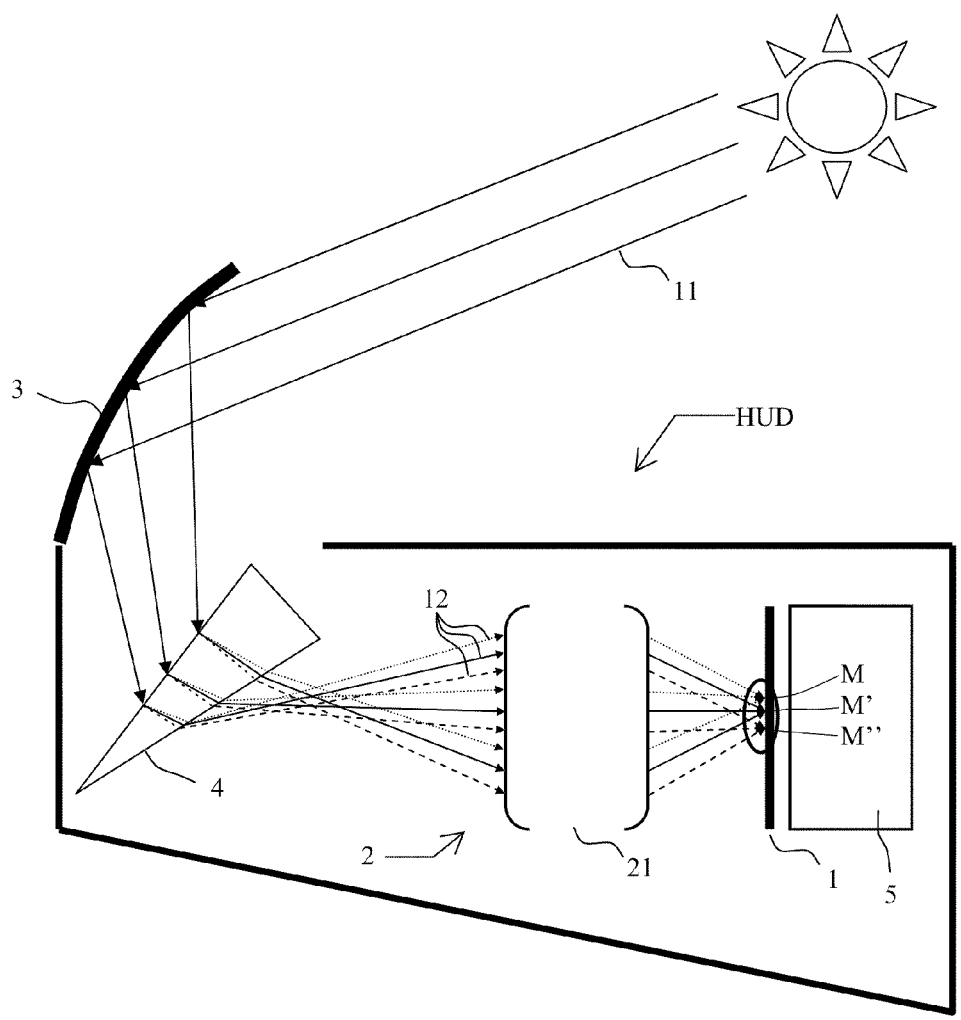
FIG. 2 represents a head-up display with curved combiner according to the invention subjected to solar illumination.
Figure 3:
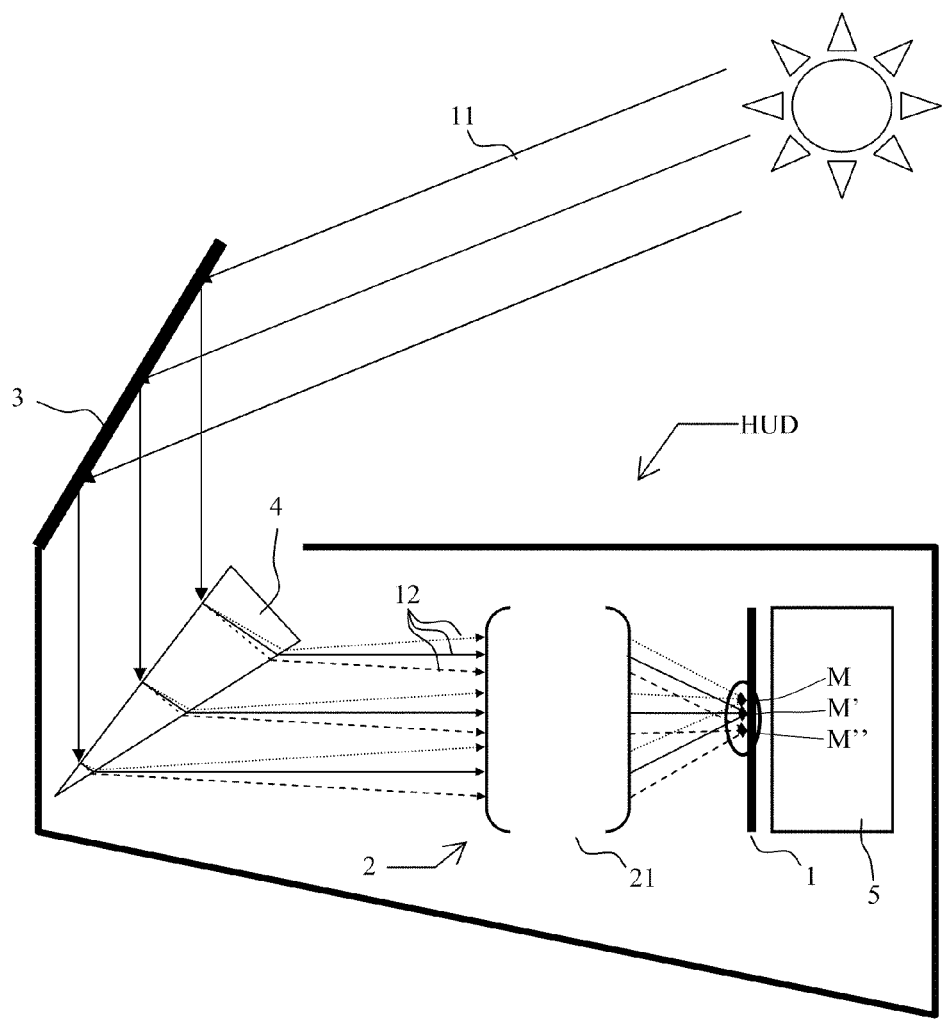
FIG. 3 represents a head-up display with flat combiner according to the invention subjected to solar illumination.

If this is not the case, it is possible to introduce, into the combiner optic of the optical system an additional prism as can be seen in FIGS. 2 and 3. The HUD of FIG. 2 comprises a curved plate combiner 3. In this configuration, a set of convergent solar beams originating from the reflection on the combiner passes through the prism 4. The HUD of FIG. 3 comprises a flat plate combiner 3. In this configuration, a set of parallel solar beams originating from the reflection on the combiner passes through the prism 4. As can be seen in these figures, after having passed through the prism, each polychromatic light ray 11 is deflected differently according to its wavelength. In the figures, three rays 12 representing three different wavelengths are represented by solid lines, by dotted lines and by dashed lines. These rays are focused at different points denoted M, M' and M" on the imager.

In both cases the chromatism introduced by the prism is roughly the same. The orders of magnitude of this chromatism can be determined.

In the interests of simplicity, the calculations are made in the particular case of an HUD with flat combiner with a prism introduced between the combiner and the optical system, that is to say, the configuration of FIG. 3. Obviously, this calculation can be extended to other configurations with no particular difficulties.

By being reflected on the combiner, the sun's spectrum is filtered and is composed of only the wavelengths present in the spectral reflection of the combiner. Generally, the combiners are designed to work with monochrome image sources emitting in the green, where the sensitivity of the eye is at its maximum. More recently, there have been HUDs with two-colour displays and combiners making it possible to reflect both the spectral band situated in the green and a second spectral band situated in the red, the red colour being dedicated to the alarms displayed. More specifically, the two spectral bands commonly retained are a "green" first band which extends from 510 nm to 550 nm and the "red" second band which extends from 600 nm to 635 nm. If the display is a liquid crystal matrix cell, the maximum illumination that can be tolerated on the information display surface is approximately 40 kW/m$^2$. The maximum solar illumination in the absence of chromatic dispersion of the optical system is approximately 70 kW/m$^2$ in the green band and 140 kW/m$^2$ in the two bands. The prism must therefore introduce sufficient chromatism to spread the solar spot on the display by a factor of 1.75 in monochrome mode and 3.5 in two-colour mode.

It should be noted that the problem is slightly different when the solar rays pass through the combiner to enter the HUD, because the spectral response of the combiner is different in reflection mode and in transmission mode. The solution is then to add, to the optical system, a filter whose spectral response in transmit mode is identical to the spectral response in reflection mode of the combiner. This filter can be deposited on the prism 4, for example. This filter in no way hampers the display of the information, and makes it possible to have a solar illumination in transmission mode equal to or less than that in reflection mode. The problem then becomes the same in both configurations, and can be dealt with in the same way.

The chromatism calculations are made with an optical system with a focal length of 100 mm and with a glass prism with an apex angle A of 40°. The glass is manufactured by the company Sumita and its reference is K-PSFn214. Its refractive index n is defined by the following equation:

$$n(\lambda) = n_0 + \frac{B}{\lambda^2},$$

where $\lambda$ represents the wavelength of the incident beam, and $n_0$ and B are constants characteristic of the material, having the following values $n_0$=2.046 (unitless) and B=0.0336 µm$^2$.

The prism deflects the light beams with an angle of incidence of i through an angle D, dependent on the wavelength of each beam according to the following formula:

$$D(\lambda) = i - A + \arcsin\left[n(\lambda) \times \sin\left(A - \arcsin\left(\frac{\sin i}{n(\lambda)}\right)\right)\right]$$

Figure 4:
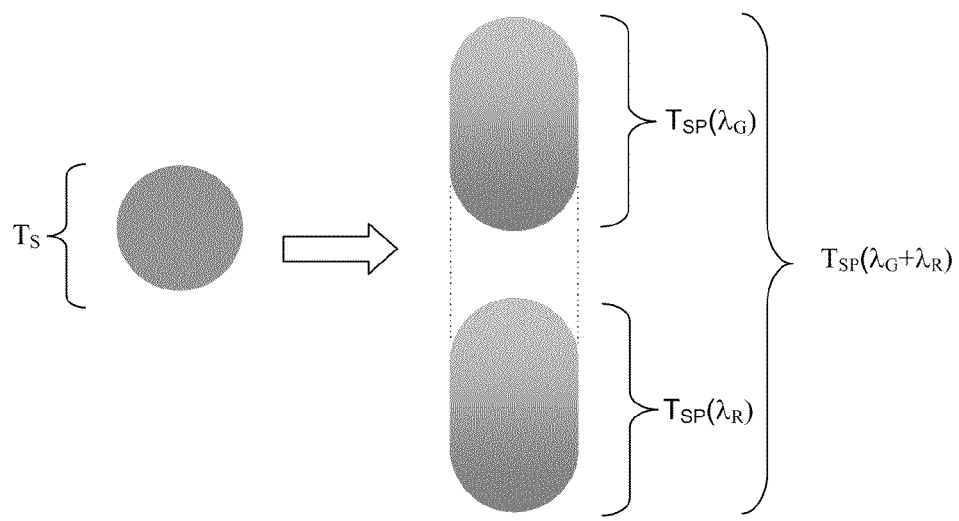
FIG. 4 represents the spreading of the image spot of the sun on the display in a display according to the invention.

The resulting spreading of the image spot of the sun $T_S$ is represented in FIG. 4. The solar spot $T_S$ is represented on the left in the absence of the prism and the solar spot $T_{SP}$ is represented on the right with the prism. In an HUD that has no lateral chromatism or has a very weak chromatism, the sun's spot $T_S$, composed of all the wavelengths, has a surface area Area2 identical to the spot produced by a single wavelength of surface area Area1. In other words, the image spots $T_S(\lambda_i)$ produced by each of the wavelengths $\lambda_i$ are identical and are superimposed at the same point on the information display surface of the HUD. In an HUD that has lateral chromatism, the sun's spot $T_{SP}$, composed of all the wavelengths, has a surface area Area 2 greater by a factor k than the spot produced by a single wavelength of surface area Area1. When the solar spectrum, filtered by the combiner, is monochrome and centred on a wavelength $\lambda_G$, the solar spot $T_{SP}(\lambda_G)$ has an oblong shape. When the spectrum is two-colour, the solar spot $T_{SP}(\lambda_G+\lambda_R)$ comprises two oblong shapes $T_{SP}(\lambda_G)$ and $T_{SP}(\lambda_R)$, as indicated in FIG. 4, centred on the image spots with the wavelengths $\lambda_G$ and $\lambda_R$. k is the solar illumination reduction factor.

Figure 5:
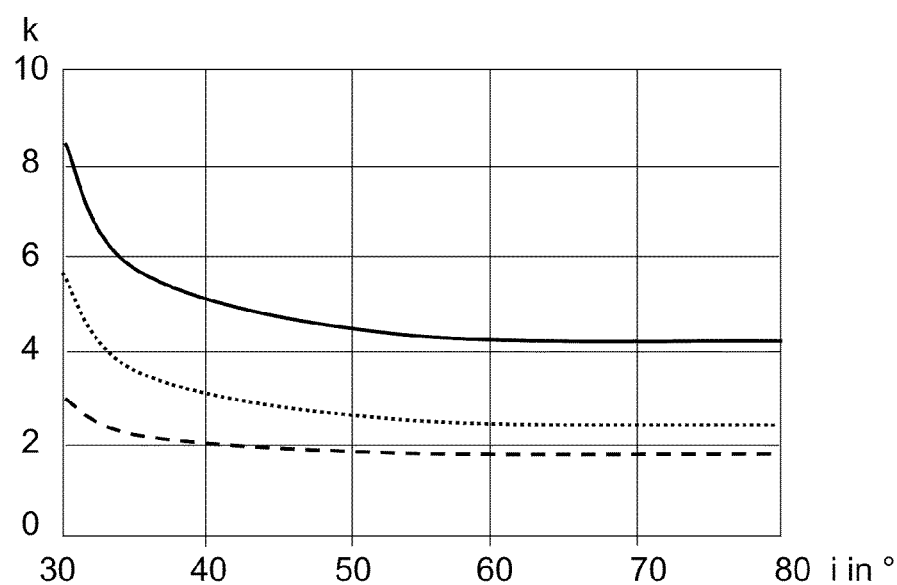
FIG. 5 represents the ratio of the areas of the solar spots before and after spreading, as a function of the angle of incidence of the beam on a prism of given angle.

The results obtained are illustrated in FIG. 5 which represents the factor k for an angle of incidence i of between 30 and 80 degrees in monochrome mode (dotted line curves) and in two-colour mode (solid line curve). It can be seen that the solar illumination reduction factor is always greater than 2 in monochrome mode and greater than 4 in two-colour mode. Thus, the solar illumination drops to less than 35 kW/m² in monochrome mode or in two-colour mode. The introduction of the prism therefore clearly solves the problem of solar illumination by reducing it below the tolerance threshold of the information display surface, namely 40 kW/m².

It is very important for the information to be displayed not to be corrupted by the chromatism that has just been introduced.

Laser sources such as laser diodes have very small spectral widths. It is also possible to use filtered monochromatic sources to obtain a narrow spectral band. The expression "narrow spectral band" should be understood to mean a spectral emission width at mid-power not exceeding a few nanometres. It should be noted that, when the sources are virtually monochromatic and therefore strongly coherent, spurious phenomena may appear such as "speckle" which represents image granularity. This can be greatly reduced by using a number of mutually incoherent illumination sources for one and the same display. The undesirable "speckle" effects are thus strongly averaged out.

The green sources are used in monochrome HUDs and both green and red sources are used in two-colour HUDs. If the monochromatic light sources of the display have the following spectral characteristics:

green source: 530 nm±1 nm
red source: 617 nm±1 nm then the deflection D induced by the prism is represented on the two dotted line curves of FIG. 6. The resolution limit of the eye is represented in bold lines. It can be seen that for angles of incidence of between 50° and 80°, the maximum deflection of the green and red sources is of the order of the resolution limit of the eye, which varies between 1 and 3 minutes of arc depending on the person, or between 0.3 mrad and 0.9 mrad. Since the induced deflection is negligible compared to the trace width of the HUD, the quality of the images displayed is unaffected by the introduction of chromatism.

Depending on the need to reduce solar illumination, which varies from one system to another, various optical materials can be used to manufacture the optical element with strong chromatic dispersion, because the latter (or the solar illumination) will be all the greater (or lesser) as the refractive index increases and the Abbé number diminishes. For a prism, the dispersion also depends on its angle at the vertex and on the angle of incidence of the rays.

However, although the chromatism does not degrade the quality of the image to be displayed, the optical element that provides this chromatism may introduce aberrations such as distortion. In the case of a prism, the deflection depends on the angle of incidence of the beams and thus introduces distortion. It also depends on the wavelength. This aberration may be compensated for by calculating the reverse deformation and by applying it beforehand to the image on the information display surface. By applying a different deformation for the various wavelengths of the image, the aberrations of the final image at the HUD output may be totally offset.

This device has the advantage of not utilizing any detection such as, for example, the detection of solar illumination above the tolerance threshold of the display surface, detection of the presence of the pilot, etc. There are therefore neither sensors nor electronic systems to be added.

Furthermore, the reduction in the illumination is instantaneous and does not affect the quality of the image projected using a monochromatic light source. In practice, with a monochromatic source, the increase in the trace width due to the chromatism remains negligible.

Finally, the introduction of an element with strong chromatic dispersion does almost nothing to reduce the transmission coefficient of the optical system, which avoids having to increase the electrical consumption to obtain the same luminance level.

This device therefore improves the resistance of an HUD to solar illumination, whether it is used in the aeronautical or motor vehicle field, and enables technologies to be used for the imaging system which do not adequately withstand the solar illumination levels that may be encountered.

What is claimed is:

1. A head-up type display system comprising
at least one display,
an optical system and a combiner, said optical system and said combiner being arranged so that an image on the at least one display is collimated, the at least one display emitting in at least one first optical spectrum of first spectral width, the at least one display being arranged so as to withstand illumination of a predetermined level,
wherein a lateral chromatism of the optical system is sufficiently strong for a level of solar illumination received by the at least one display to be always less than said predetermined level, and said lateral chromatism is sufficiently weak for the dispersion of the at least one first optical spectrum emitted by the at least one display and seen by a user to be less than or equal to a resolution limit of the human eye.

2. The display system according to claim 1, wherein the at least one display emits in at least one second optical spectrum of second spectral width, the lateral chromatism of the optical system being sufficiently weak for the dispersion of the at least one second optical spectrum emitted by the at least one display and seen by the user to be less than or equal to the resolution limit of the human eye.

3. The display system according to claim 2, wherein the solar spot received by the at least one display is spread by a factor of at least 3.5.

4. The display system according to claim 1, wherein the combiner comprises at least one flat semi-reflecting plate.

5. The display system according to claim 1, wherein the combiner comprises at least one curved semi-reflecting plate.

6. The display system according to claim 1, wherein the optical system comprises at least one prismatic optical element.

7. The display system according to claim 1, wherein the at least one display comprises a flat matrix screen lit by a narrow-band monochromatic source.

8. The display system according to claim 7, wherein the narrow-band monochromatic source comprises one or more lasers or laser diodes of a first type, emitting at a first wavelength.

9. The display system according to claim 8, wherein the flat matrix screen is lit by one or more lasers or laser diodes of a second type, emitting at a second wavelength.

10. The display system according to claim 1, further comprising means for generating a digital image on said at least one display, said means comprise means for applying a distortion correction to the image, said distortion correction being a function of a geometrical distortion and of the lateral chromatism of the optical system and the combiner.

11. The display system according to claim 1, wherein the solar spot received by the at least one display is spread by a factor of at least 1.75.

* * * * *